UNITED STATES PATENT OFFICE.

FRITZ ROESSLER, OF FRANKFORT-ON-THE-MAIN, GERMANY, ASSIGNOR TO THE ROESSLER & HASSLACHER CHEMICAL COMPANY, OF NEW YORK, N. Y., A FIRM.

PROCESS OF MAKING SODIUM CYANID.

SPECIFICATION forming part of Letters Patent No. 708,079, dated September 2, 1902.

Application filed February 4, 1899. Serial No. 704,564. (No specimens.)

*To all whom it may concern:*

Be it known that I, FRITZ ROESSLER, a subject of the Emperor of Germany, and a resident of Frankfort-on-the-Main, Germany, have invented certain new and useful Improvements in Processes of Making Sodium Cyanid, of which the following is a specification.

The majority of methods for obtaining cyanids synthetically yield in variable proportions a mixture of charcoal, alkali cyanid, and alkali carbonate, from which a marketable product is only derived by lixiviation, evaporation, and fusion. Numerous difficulties attend these operations. Lixiviating the mixture yields a lye which contains so much carbonate mixed with the cyanid that direct evaporation gives a product of low value. Moreover, it is known that cyanid solutions when evaporated without a vacuum undergo decomposition. Complete evaporation to dryness in a vacuum is, however, rendered almost impossible, because the salt which separates forms a sticky mass on the floor of the vessel, prohibiting agitation by means of stirrers. Furthermore, this deposit is a bad conductor of heat and so retards evaporation. Siepermann's method (D. R. P., No. 51,562) takes advantage of the difference in solubility of potassium cyanid and potassium carbonate, the former being salted out from a warm concentrated solution by adding potassium carbonate. The method is not applicable to the sodium salts, as the solubility relationship is quite different. In synthesizing cyanids, however, the sodium salts offer a series of other advantages over the potassium compounds which makes it desirable to employ them.

The objects of the present method are to obtain from a mixture of sodium cyanid and carbonate of soda in any proportions a sodium-cyanid lye which is nearly free from sodium carbonate and to avoid complete evaporation and the loss of cyanid which this involves and prepare from this lye a pure anhydrous sodium cyanid which can be converted direct into the marketable form by fusion.

The first part of the process depends on the fact not hitherto observed that contrary to the behavior of the potassium salts the sodium cyanid precipitates sodium carbonate from the lyes.

While a solution containing three hundred and twenty grams of sodium cyanid (NaCy) per liter is capable of dissolving sixty-five grams of sodium carbonate, ($Na_2CO_3$,) a sodium-cyanid solution concentrated at 24° centigrade (containing four hundred and twenty-four grams of NaCy per liter) only dissolves forty-seven grams of $Na_2CO_3$, a solution concentrated at 33° centigrade (with five hundred and seventeen grams of NaCy per liter) dissolving only twenty-six grams of $Na_2CO_3$. The maximum solubility of sodium cyanid (five hundred and seventeen grams in one liter of solution) is attained at 33° centigrade. No further quantity of sodium cyanid dissolves on raising the temperature. If, therefore, a mixture of sodium cyanid and carbonate of soda be treated with moderately-warm water in quantity insufficient to completely dissolve the sodium cyanid, the maximum concentration should yield, according to the above data, a lye containing five hundred and seventeen grams of NaCy and twenty-six grams of $Na_2CO_3$ per liter. A second treatment with such a quantity of water as is necessary to dissolve all the cyanid left in the mass after the first treatment would then yield a lye which contains the remainder of the NaCy and much more sodium carbonate than existed in the first lye. If this second solution be used for lixiviating a fresh quantity of the mixture of NaCy and $Na_2CO_3$, a further amount of NaCy passes into solution, no $Na_2CO_3$ being dissolved, but rather a portion of the $Na_2CO_3$ originally present in the lye is precipitated in proportion to the NaCy dissolved. On washing the residue there is obtained a lye which, being again poorer in cyanid and richer in carbonate, can be used for extracting the subsequent portions. By systematic extraction at a moderate temperature it is in this manner possible to obtain from a chance mixture of sodium cyanid and sodium carbonate a lye containing NaCy and $Na_2CO_3$ in the proportion of one hundred to five. The lye which has been concentrated in this manner yields on cooling a copious deposit of crystals consisting of NaCy+2aq. These crystals can be freed from water of crystallization by exposure to a vacuum at ordinary temperatures over sulfuric acid or calcium chlorid. The following is a more rational method, depending on the fact, hitherto unobserved, that if the crystals of NaCy+2aq are dissolved in their water of crystallization at 33° they do not yield a clear liquid. Forty per cent. of NaCy which they contain separates as anhydrous salt, which is not redissolved on raising the temperature. The anhydrous salt separates in a granular form and is quite easily freed from the mother-liquid by suitable means. The latter solution again contains five hundred and seventeen grams of NaCy per liter and deposits crystals of NaCy+2aq on cooling. The mother-liquors obtained in the crystallization are used for dissolving fresh quantities of cyanid or concentrated in a vacuum until containing five hundred and seventeen grams of NaCy per liter.

What I claim, and desire to secure by Letters Patent, is—

1. The method substantially as hereinbefore described of obtaining sodium cyanid, which consists in treating a mixture of sodium cyanid and sodium carbonate with insufficient water to dissolve the cyanid completely, forming a lye, separating the lye from the mixture, again treating the remaining mixture with such a quantity of water as is necessary to dissolve all the cyanid left in the mass after the first treatment forming a second lye, and lixiviating a fresh quantity of the mixture of sodium cyanid and sodium carbonate with the second lye, whereby the sodium carbonate in the solution is displaced by sodium cyanid, as and for the purposes set forth.

2. The method substantially as hereinbefore described of obtaining sodium cyanid, which consists in treating a mixture of sodium cyanid and sodium carbonate with insufficient water to dissolve the cyanid completely, forming a lye, separating the lye from the mixture, again treating the remaining mixture with such a quantity of water as is necessary to dissolve all the cyanid left in the mass after the first treatment, forming a second lye, lixiviating a fresh quantity of the mixture of sodium cyanid and sodium carbonate with the second lye, whereby the sodium carbonate in the solution is displaced by sodium cyanid, and depositing crystals of sodium cyanid by cooling, as and for the purposes set forth.

3. The method substantially as hereinbefore described of obtaining sodium cyanid, which consists in treating a mixture of sodium cyanid and sodium carbonate with insufficient water to dissolve the cyanid completely, forming a lye, separating the lye from the mixture, again treating the remaining mixture with such a quantity of water as is necessary to dissolve all the cyanid left in the mass after the first treatment, forming a second lye, lixiviating a fresh quantity of the mixture of sodium cyanid and sodium carbonate with the second lye, whereby the sodium carbonate in the solution is displaced by sodium cyanid, depositing crystals of sodium cyanid by cooling, and freeing the crystals from their water of crystallization, as and for the purpose set forth.

4. The method substantially as hereinbefore described of obtaining sodium cyanid, which consists in treating a mixture of sodium cyanid and sodium carbonate with insufficient water to dissolve the cyanid completely, forming a lye, separating the lye from the mixture, again treating the remaining mixture with such a quantity of water as is necessary to dissolve all the cyanid left in the mass after the first treatment, forming a second lye, lixiviating a fresh quantity of the mixture of sodium cyanid and sodium carbonate with the second lye, whereby the sodium carbonate in the solution is displaced by sodium cyanid, depositing crystals of sodium cyanid by cooling, and fusing the crystals of sodium cyanid in their water of crystallization at about 33° centigrade, whereby the cyanid is separated in a state free from water, as and for the purpose set forth.

In testimony whereof I have signed my name to this specification in the presence of two subscribing witnesses.

FRITZ ROESSLER.

Witnesses:
PAUL MAUSOLFF,
OTTO STRAUB.